Figure 1:
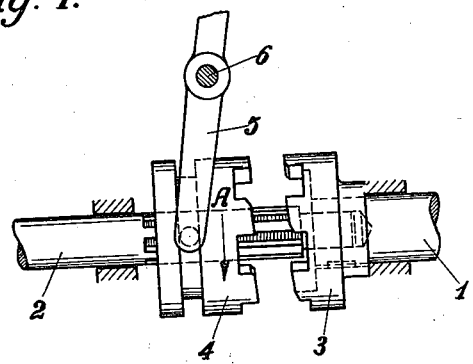

July 28, 1936.  K. MAYBACH  2,049,126

CLAW COUPLING

Filed Feb. 16, 1933

Inventor:
Karl Maybach

Patented July 28, 1936

2,049,126

UNITED STATES PATENT OFFICE 2,049,126

CLAW COUPLING

Karl Maybach, Friedrichshafen, Germany, assignor to Maybach-Motorenbau G. m. b. H., Friedrichshafen, Germany Application February 16, 1933, Serial No. 657,005
In Germany February 23, 1932

9 Claims. (Cl. 192—67)

My invention relates to claw couplings and has special reference to couplings of this kind in which the claws are provided with bevelled front faces for the purpose of preventing engagement of the claws until the originally slower coupling half begins to overrun the originally faster coupling half or vice versa. Couplings of this kind and their application are for instance disclosed in my U. S. Patent Reissue No. 17,707.

While the coupling halves of such couplings rattle past each other they are resiliently pressed against each other, for example by a spring. If there are great differences in speed of rotation when the coupling halves meet, a comparatively great pressure force is necessary to keep them in constant touch with each other. On the other hand, this force ought not to exceed a certain degree so as to avoid unnecessary noise. That is why the angle of inclination of the front faces of the teeth should be possibly small.

After the originally slower half has overrun the originally faster half the coupling teeth come to their first state of engagement in which only the top portions bear against each other. The greater the angle of inclination of the front faces of the teeth is, the greater is the surface of the top portions which first come to engage. To make sure that in all events the teeth engage, this top surface portion ought not to be too small. That is why the angle of inclination of the front faces of the teeth should be not so small.

According to my invention I provide a special shape of the claw teeth which answers to both demands. For this purpose the main portion of the front face has a small angle of inclination and at the lower end thereof I provide a short bevel of a considerably steeper angle.

Coupling halves which are provided with my new shape of the teeth will be repulsed only with a comparatively small force which corresponds to the small angle of the main portion of the front faces of the teeth. Not before the relative speed of rotation of both coupling halves has decreased considerably the steeper portions of the front faces of their teeth will meet; still the coupling halves will be repulsed from each other, the repulsing force being increased because of the steeper inclination of the front faces, but at the same time being decreased because of the slower speed of rotation. On the whole, the repulsing force will not exceed the maximum which it had with greater speed of rotation and the smaller angle of inclination of the front faces being operative.

At last the coupling halves come to a relative stand-still and immediately thereafter their relative movement reverses. Consequently the teeth slide along their steeper inclined front faces into final engagement and immediately find comparatively long bearing side faces.

All this will be understood best when having reference to the drawing which represents an example embodying my invention.

Figure 2:
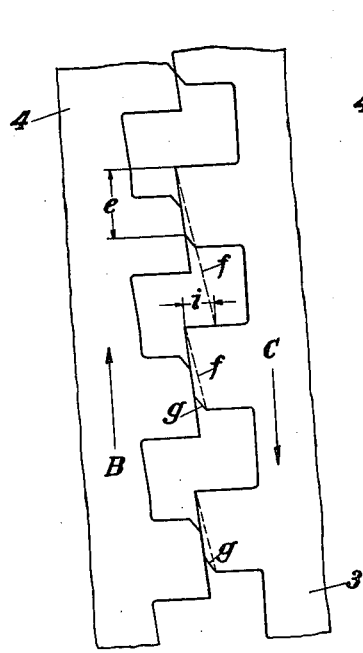
Figure 3:
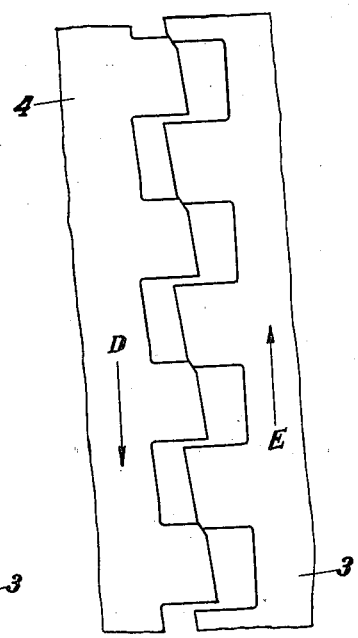

Fig. 1 is a side view of a claw coupling. Figs. 2 and 3 are mere diagrams on an altogether different scale and showing the shape of the teeth as on a development of the circumference of the claw couplings in different positions.

There is a shaft 1 to which claw coupling half 3 is fixed; whereas claw coupling half 4 is splined to shaft 2. By means of lever 5 journaled at 6 coupling half 4 may be moved towards the right so as to come into engagement with coupling half 3. It is assumed that both coupling halves rotate in the direction indicated by arrow A in Fig. 1, but coupling half 3 rotating faster than coupling half 4, so that they do not engage but repulse each other rattling past each other. Their relative sense of rotation is indicated by arrows B and C in Fig. 2.

The front faces of the coupling teeth over their major portion $e$ have a small angle of inclination about from 2 to 10 degrees. At their rear portion $g$ there is a steeper inclination about from 15 to 50 degrees, both inclinations together forming a median theoretical inclination as shown in dotted lines at $f$, which affords a depth $i$ of prior engagement sufficient for the necessary bearing of the side faces of the teeth after reversing the relative sense of rotation of the two coupling halves.

As pointed out above, the teeth of the two coupling halves 3 and 4 when approaching each other while rotating as indicated by the arrows in Fig. 2 are repulsed, as the surface portions $e$ slide upward along each other and cause repulsion because of their inclination. While the relative speed of the coupling halves is high the teeth jump over the intermediate gaps because of the repulsion and they meet again on their major inclined surface portions $e$. When the speed becomes slower they first meet on their minor portions $g$ and are afterwards lifted to their major portions $e$, thus being again repulsed. As soon as out of some outer influence the relative direction of rotation is reversed the teeth slide downward first along their major front portions $e$ and finally along their minor steep portions $g$.

This latter situation is shown in Fig. 3 in which the arrows D and E indicate the relative movement of both coupling halves shortly before coupling half 4 begins to bear against coupling half 3 and to cause it to rotate also in the direction of arrow D.

Thus, when rotating as indicated in Fig. 2, the coupling halves are repulsed without great noise and yet when coming into engagement as shown in Fig. 3, the large portions 1 of the side faces bear against each other from the beginning.

Of course, if double claw couplings are used, as shown in my prior Patent Reissue No. 17,707 the shape of the teeth may be chosen in accordance to the present invention on both couplings.

I do not want to be limited to the details disclosed or shown in the drawings, as many variations will occur to those skilled in the art.

What I claim is:

1. A claw coupling for the purpose described comprising: two coupling halves, each of said halves being provided with teeth adapted to repulse each other until the originally slower coupling half begins to overrun the originally faster coupling half; all the teeth of both said coupling halves having substantially equal shape, said shape being formed of two side faces adapted to transmit rotation from one of said coupling halves to the other one of said coupling halves and of a broken front face made up of two portions, the first one of said portions having a small angle of inclination towards the plane at right angles to the axis of said claw coupling, the second one of said front face portions having a steeper angle of inclination with regard to the same plane, said first portion having more than double the length of said second portion; the inclination of both said portions being directed towards the same side face and the second portion abutting the lowermost end of the first portion.

2. A claw coupling having teeth with inclined front faces, each front face comprising several distinct angularly related and adjoining inclined surface portions, the major of said front face portions having a smaller angle of inclination than the adjoining steeper rear face portions, the inclination of both said adjoining face portions being towards the same sides of the respective teeth.

3. A claw coupling comprising two coupling halves, each of said halves having teeth with two side faces and a front face sloped towards one of said side faces, the sloped front face of each of said teeth being formed as several distinct inclined surface portions and including a major face portion with small inclination, and a minor face portion with steeper inclination angularly adjoining said major portion, said steeper portion abutting the lowermost end of said major portion, both said portions being inclined toward the same side face.

4. A claw coupling having teeth with inclined front faces, the major portions of said front faces extending over more than two-thirds of the front faces and having a smaller angle of inclination than their steeper rear portions, the steeper rear portions being shorter than one-third of the front faces, the inclination of both portions being directed towards the same sides of the respective teeth.

5. A claw coupling comprising two coupling halves, each of said halves having teeth with two side faces and a front face sloped towards one of said side faces, the sloped front face of each of said teeth comprising a major face portion with small inclination and a minor face portion with steeper inclination which is shorter than half the length of said major portion, said major and minor face portions being inclined towards the same side face.

6. A claw coupling having claw teeth with front faces formed to include a plurality of adjoining inclined plane surface portions with different angles of inclination, said plane surface portions sloping in the same direction lengthwise of said faces and being arranged with a surface portion of greater inclination adjoining the low end of a surface portion of smaller inclination.

7. A claw coupling having claw teeth with a vertical side face, an inclined main front face portion sloped downwardly towards said side face, and a further face portion having a steeper inclination in the same direction located between the main front face portion and said vertical side face.

8. A claw coupling comprising opposing coupling halves provided with coacting claw teeth, the corresponding teeth on the respective coupling halves having coacting inclined front face portions of small inclination slidably engageable with each other to initially repulse and reduce the relative speeds of the coupling halves, coacting intermediate inclined face portions of steeper inclination adjoining the low ends of the respective front face portions and becoming operative following preliminary engagement of the front face portions to slidably engage and repulse each other until the relative speeds of the coupling halves is further reduced, and coacting vertical side face portions adjoining the low ends of the respective intermediate face portions and slidable into positive driving engagement with each other to lock the coupling halves together when the originally slower coupling half begins to overrun the originally faster coupling half.

9. A claw coupling comprising opposing coupling halves provided with coacting claw teeth, the corresponding teeth of respective coupling halves having initially engageable inclined plane face portions of small inclination, intermediate plane face portions more steeply inclined in the same direction angularly adjoining the low ends of the respective face portions of small inclination, and vertical face portions adjoining the low ends of the respective intermediate face portions.

KARL MAYBACH.